United States Patent [19]
Schemith

[11] 3,971,577
[45] July 27, 1976

[54] UNION DEVICE FOR FLEXIBLE TUBING
[75] Inventor: Gerard Schemith, Pontarlier, France
[73] Assignee: Scovill Manufacturing Company, Waterbury, Conn.
[22] Filed: Aug. 16, 1974
[21] Appl. No.: 498,129

[52] U.S. Cl. .............................. 285/238; 285/305; 285/356; 285/382
[51] Int. Cl.² ....................................... F16L 17/02
[58] Field of Search ........... 285/356, 339, 238, 421, 285/113, 239, 323, 305, 382, 307, 403, 382.7, 110, 340, 259; 403/365, 367, 368, 243, 263, 351, 361

[56] References Cited
UNITED STATES PATENTS

| | | | |
|---|---|---|---|
| 2,346,051 | 4/1944 | Seamark | 285/339 |
| 2,831,711 | 4/1958 | Leadbetter | 285/238 |
| 2,996,317 | 8/1961 | Kibbie et al. | 285/421 X |
| 3,429,596 | 2/1969 | Marshall | 285/340 |
| 3,447,820 | 6/1969 | Durnan | 285/356 X |
| 3,637,240 | 1/1972 | Meier | 285/238 |
| 3,740,083 | 6/1973 | Zenhausern | 403/243 |
| 3,743,326 | 7/1973 | Courtot et al. | 285/323 X |
| 3,765,706 | 10/1973 | Bram | 285/356 X |
| 3,817,561 | 6/1974 | Kay | 285/259 X |
| 3,858,913 | 1/1975 | Gallagher | 285/238 |

FOREIGN PATENTS OR APPLICATIONS

| | | | |
|---|---|---|---|
| 803,405 | 6/1936 | France | 285/110 |
| 107,946 | 4/1964 | Netherlands | 285/238 |
| 323 | 1/1902 | United Kingdom | 403/365 |

Primary Examiner—Thomas F. Callaghan
Attorney, Agent, or Firm—Robert E. Burns; Emmanuel J. Lobato; Bruce L. Adams

[57] ABSTRACT

A union device comprises a body having an inner bore communicating with an enlarged annular opening in a face of the body. A separate annular piece is secured in the opening with a press-fit by means of an external barb on the piece which opposes removal of the piece. The piece has an oppositely directed internal annular barb which engages in the outer surface of the end of a press-fitted flexible tube to tightly secure the tube without constricting its inner passageway which communicates with said bore.

9 Claims, 1 Drawing Figure

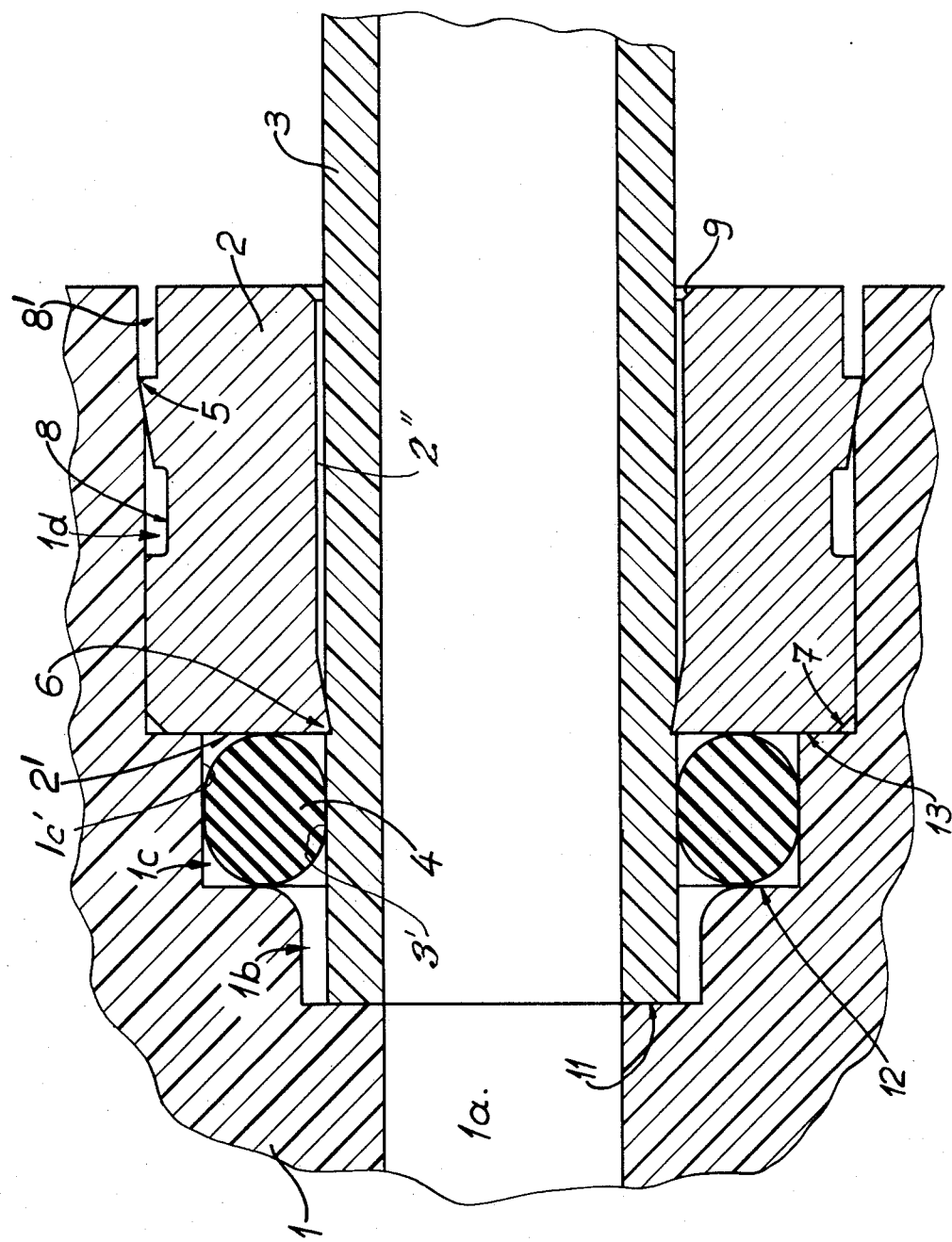

UNION DEVICE FOR FLEXIBLE TUBING

The invention relates to union or connector devices for the securing of flexible tubes, for example of the type used in logical pneumatic circuits which employ a compressed fluid at relatively low pressures up to 15 bars.

According to the invention, a union or connector device comprises a body having an inner bore communicating with an enlarged annular opening in a face of the body, a separate annular piece secured in said opening, and a flexible tube one end of which is fitted in the annular piece and communicates with said bore, the annular piece having an internal annular barb which engages in the outer surface of the tube to fluid-tightly secure the tube with no or substantially no constriction of the inner passageway of the tube.

The invention also covers a set of parts adapted to be assembled to form such a union device and, for assembly with a flexible tube into such a union device, an appropriately constructed body and separate annular piece.

An embodiment of the invention will now be described, by way of example, with reference to the accompanying drawings the single FIGURE of which is an axial cross-section through an assembled union device.

In a connector body 1 of a fluid distribution box is provided a cylindrical passage or bore 1a communicating with an enlarged annular opening in a face of body 1 defined by axially extending body wall portions of the recesses or bores 1b, 1c and 1d of successively increasing diameters and corresponding radially extending shoulders 11, 12 and 13, perpendicular to the axis of the bores.

A toric sealing joint 4 is fitted in bore 1c and a generally cylindrical separate annular locking member or piece 2 is secured in bore 1d. The piece 2 is of the same or a harder material than body 1 and is provided with external and internal annular barbs 5 and 6 disposed in generally opposite directions. The internal barb 6 tapers inwardly from the generally smooth inner surface 2'' of the locking ring 2 to the end surface 2' of this ring. The outer edge of said end is bevelled at 7 and the inner edge of the other end of the piece is bevelled at 9. These bevels facilitate the insertion of piece 2 in bore 1d and the insertion of a tube in piece 2. The outer face of piece 2 is provided with annular recesses 8 and 8' separated by the barb 5. The front outer part of piece 2 has a close sliding fit in bore 1d, but the widest edge of barb 5 has a diameter slightly greater than the diameter of bore 1d. Piece 2 can thus be push-fitted in bore 1d until its forward face 2' abuts against shoulder 13, and barb 5 then strongly opposes removal of the piece 2 from bore 1d.

A flexible tube 3, of softer material than piece 2 and whose inner passageway has the same diameter as bore 1a, is push-fitted in the piece 2 until its end abuts against shoulder 11. The outer diameter of tube 3 is slightly less than the inner diameter of piece 2 apart from barb 6 whose edge has a slightly smaller diameter. The orientation of barb 6 enables insertion of tube 3, but once the tube is in place the barb 6 bites into the outer surface of tube 3 to fluid-tightly secure the tube 3 with substantially no constriction of its inner passageway.

Fluid-tightness of the union is completed by the barb 5 and by the joint 4 which is compressed in an annular housing defined between shoulder 12 and side wall 1c' of bore 1c of piece 1, the forward face 2' of piece 2, and the outer face of tube 3.

The union is assembled by placing joint 4 in bore 1c, driving piece 2 into bore 1d until end 2' abuts against shoulder 13, and pushing the tube 3 into piece 2 until its end abuts against shoulder 11 and thus compresses the toric joint or sealing ring 4, thereby also expanding this ring between side wall 1c' and the opposite, outer surface portion 3' of tube end 3.

To remove tube 3, it is necessary to exert a sufficiently strong pull to free it from engagement with barb 6. This may involve damage to the end of the tube, and the damaged end will usually be cut off before reinserting the tube.

In use, the pressure inside tube 3 increases the fluid-tightness of the union by pressing tube 3 against barb 6 and joint 4, and possibly against the inner wall of piece 2.

As a variation, the piece 2 could be secured by other means, for example by sticking or by screwing complementary external and internal threads on piece 2 and in bore 1d.

The described union includes a low number of component parts which can be easily manufactured. It does not perturb the flow of fluid since there is no appreciable constriction of the passageway of tube 3, and fluid-tightness is improved when the tube is under pressure.

What is claimed is:

1. A connector for rapid, fluidtight connecting to a flexible tubular member, comprising:

a connecting body having therein an inner bore and having, coaxially with the bore at an end thereof, a first recess wider than and communicating with the bore and extending away from it, a first annular shoulder extending outwardly from the first recess remotely from the bore, a second recess wider than and communicating with the first recess and having a side wall extending from a periphery of the first shoulder away from that shoulder, a second annular shoulder extending outwardly from an end of the side wall remotely from the first shoulder, and a third recess wider than and communicating with the second recess and extending away therefrom to a surface of the connector body;

a sealing ring inserted in the second recess, engaging the first shoulder and the side wall and having sealing ring surface portions exposed opposite the side wall and the first shoulder;

a locking ring slidingly receivable in use, in a direction axial of the inner bore, in the third recess to abut an end of the locking ring against the second shoulder, the locking ring having a generally smooth inner surface receptive in use, in a direction axial of the inner bore, of an end portion of a flexible tubular member for engagement of an outer surface portion of the tubular member's end portion with one of the exposed surface portions of the sealing ring, the locking ring having an end surface at said end thereof engageable with the other exposed surface of the sealing ring to compress the sealing ring against the first shoulder and thereby against the side wall of the second recess and the outer surface portion of the tubular member's end portion; and inner and outer barbs on the locking ring, the outer barb being disposed on an outer surface of the locking ring and being inclined relative thereto to oppose withdrawal of the locking ring, once received in the third recess, from the connecting body, and the inner barb being disposed on the generally smooth inner surface of the locking ring and being inclined relative thereto, oppositely to the inclination of the outer barb, to oppose withdrawal of the flexible tubular member from the locking ring once the tubular member is received therein;

thereby enabling rapid locking of the tubular member to the connecting body through the locking ring, while also enabling simultaneous fluidtight connecting of the tubular member with the connecting body through the sealing ring compressed by the locking ring.

2. A connector according to claim 1 in which the connector body has an additional annular shoulder extending outwardly from the end of the inner bore, in the first recess, for abutment of the end portion of the tubular member against the additional shoulder.

3. A connector according to claim 2 in which the first recess and the additional shoulder have outer diameters greater than the tubular member, thereby permitting expansion of the flexible tubular member in the first recess when fluid pressure is applied to the inside of said member.

4. A connector according to claim 3 in which, before use, the normal inner diameter of the sealing ring is slightly smaller than the normal outer diameter of the tubular member, thereby promoting the fluidtight connecting not only by the compressing of the sealing ring but also by the expansion of the flexible tubular member when the fluid pressure is applied.

5. A connector according to claim 1 in which the inner barb is disposed on the inner surface of the locking ring adjacent the end surface of the locking ring engageable with the sealing ring.

6. A connector according to claim 1 in which the locking ring has a bevelled outer edge at the end surface thereof engageable with the sealing ring, to facilitate insertion of the locking ring in the third recess.

7. A connector according to claim 1 in which the locking ring has a bevelled inner edge remotely of the end surface thereof engageable with the sealing ring, to facilitate insertion of the flexible tubular member in the locking ring.

8. A connector according to claim 1 in which the inner bore of the connecting body has a diameter equal to an inner diameter of the flexible tubular member.

9. A connector according to claim 1 in which the locking ring is as long, axially of the inner bore, as the third recess.

* * * * *